United States Patent [19]

Nordstrom

[11] 3,800,713
[45] Apr. 2, 1974

[54] SELF-ERECTING CARGO PALLET LOCK

[76] Inventor: Arnold B. Nordstrom, 3855 Paseo de las Tortugas, Torrance, Calif. 90505

[22] Filed: Jan. 18, 1973

[21] Appl. No.: 324,828

[52] U.S. Cl. .......... 105/369 A, 244/118, 248/119 R
[51] Int. Cl. ....... B60p 7/08, A44b 21/00, B65j 1/22
[58] Field of Search...105/369 A; 248/361 A, 119 R; 244/118; 24/201

[56] References Cited
UNITED STATES PATENTS

| | | | |
|---|---|---|---|
| 3,204,581 | 9/1965 | Davidson | 105/369 A |
| 3,210,038 | 10/1965 | Bader et al. | 105/369 A |
| 3,282,550 | 11/1966 | Warren | 105/369 A |
| 3,377,040 | 4/1968 | Hansen | 105/369 A |
| 3,381,921 | 5/1968 | McDonough et al. | 105/369 A |
| 3,486,204 | 12/1969 | Hurtner et al. | 105/369 A |
| 3,641,940 | 2/1972 | Evans | 105/369 A |
| 3,693,920 | 9/1972 | Trautman | 105/369 A |

Primary Examiner—Drayton E. Hoffman
Attorney, Agent, or Firm—John Holtrichter, Jr.

[57] ABSTRACT

A cargo pallet lock for use in vehicles such as aircraft, trucks, ships, and the like, is described. The lock is used to secure load supporting members or pallets to accommodating floor structures in the vehicles and includes a T-headed pallet-engaging lock post which is slidably mounted in a body member and is securable to the vehicle floor structure. The lock post is biased toward an elevated end position from a recessed end position and the device also includes latch-release means for releasably holding the lock post in its recessed position after the member has been retracted by manual operation of a retract lever. Upon being released, the lock post snaps to its elevated position where horizontal load forces incident thereon are transferred by novel structure to the body structure of the lock.

16 Claims, 6 Drawing Figures

PATENTED APR 2 1974 3,800,713

SELF-ERECTING CARGO PALLET LOCK

BACKGROUND OF THE INVENTION

The background of the invention will be set forth in two parts.

FIELD OF THE INVENTION

The present invention pertains generally to the field of cargo transportation and more particularly to cargo pallet locks for securing load supporting members in vehicles, but is particularly adapted for use in aircraft.

DESCRIPTION OF THE PRIOR ART

When vehicles are used to transport cargo, it is desirable that the load be containerized or palletized to facilitate rapid loading and removal of the cargo from the vehicle, especially aircraft. When the cargo is in the aircraft, it is very important that the pallet be securely fastened to the floor structure of the craft to prevent shifting of the load and consequent damage to the aircraft, its crew, and to the cargo therein during normal flight conditions, including in-flight gust loading as well as adverse landing conditions and otherwise survivable crash conditions.

It is often necessary or desirable to use some aircraft for both cargo and passenger service. Of course, when the airplane is being used for transporting cargo, it is desirable to have a major portion of the floor of the airplane open to receive the cargo. In converting an aircraft from cargo to passenger service, it is necessary to install seats on the floor area which had heretofore been used for cargo. Prior art convertible aircraft of this type have a major drawback in that considerable time is required to convert the airplane from cargo to passenger service. One of the primary reasons for this is that portions of the pallet supporting structure of the aircraft had to be removed to allow installation of the seats. The seats are then installed individually and this requires additional time. This wasted time is particularly significant when the particular aircraft must be frequently converted between passenger and cargo service. Of course, a similar large amount of time is used when converting passenger service back to cargo service.

It has been found that aircraft can be more rapidly changed from cargo to passenger service and vice-versa by palletizing the passenger seats, utilizing a pallet supporting structure which will receive either or both cargo pallets and seat pallets, and by providing an extendable and retractable lock mechanism for securing the pallets. It is of course very important that the pallets be securely fastened to the vehicle. For example, in the case of a loose cargo pallet, damage to the cargo or the aircraft, or injury to the airplane crew, may result therefrom.

Many systems of the type described employ a plurality of tracks having rollers thereon over which the seat and/or cargo pallets may be easily rolled into position. The pallets are held in selected positions along the tracks, in part, by several latching means or lock assemblies, each of which has a latching member that is engagable with a transverse end of the pallet. In the more advantageous of these systems, the latching members are movable to a retracted position so that the pallets can be moved thereover without interference. Each of the latching members is usually a unitary member and when moved to the locking position, can be utilized simultaneously to restrain two adjacent pallets. The retracting latching means disclosed by the earlier prior art to secure adjacent pallets have been extremely costly structures with interlocking latchable parts to perform the locking function. Later, there was developed a latch having a solid T-member rotatable about a strength-carrying axis to its engaged position below the top of the roller means.

Although the rotatable T-member configuration is an improvement over the complex structures of the earlier art, the latching member has to be manually rotated and lifted to its elevated position and then locked thereat by a separate manual movement of the latching member. The locking assembly must then be moved longitudinally along the track to which it is attached until the latching member engages a transverse end of a pallet. In order to release the locking assembly, the latching member has to be pushed out of its lock position and the lock pulled away from the pallet before the member can be manually rotated to its retracted position. Thus, it should be evident that a new and improved technique for locking cargo pallets and the like to a supporting floor structure in a vehicle such as aircraft, for example, would constitute a significant advancement of the art.

SUMMARY OF THE INVENTION

In view of the foregoing factors and conditions characteristic of the prior art, it is a primary object of the present invention to provide a new and improved cargo pallet lock for securing a load supporting member in a vehicle having a supporting floor structure.

Another object of the present invention is to provide a cargo pallet lock wherein its lock post member is adapted to simultaneously engage and restrain two adjacent pallets.

Still another object of the present invention is to provide a cargo pallet lock having a unitary T-shape lock post member that is automatically locked in position to withstand horizontal and vertical load forces incident thereon.

Yet another object of the present invention is to provide a cargo pallet lock having a spring-loaded, self-erecting lock post member that moves horizontally in a longitudinal direction for a pre-determined distance before reaching its elevated end position whereby the pallet is engaged without movement of the lock assembly.

Yet a further object of the present invention is to provide a self-erecting cargo pallet lock including a release mechanism for its spring-loaded lock post member that is easily actuated and accessible from the top of the lock assembly.

Still a further object of the present invention is to provide a cargo pallet lock having a spring-loaded self-erecting lock post member that is easily retracted to its stowed or retracted position by movement of a readily accessible retract handle.

According to the present invention, a self-erecting cargo pallet lock is provided for securing a load supporting member in a vehicle having a supporting floor structure. The lock includes a body member securable to the floor structure below the load supporting surface thereof and adjacent the load supporting member. The invention also includes guide means associated with the body member and with a lock post member for slidably mounting the lock post member to the body member along an elongated guide path, the lock post member being movable along the guide path between an elevated end position in which the lock post member extends upwardly beyond the body member and at least partially into the plane of and lockably engagable with the load supporting member and a retracted end position in which the lock post member lies below the load supporting member. Further, the device includes bias means mounted in the body member and engaging the lock post member for biasing the movement of the lock post member along the guide path toward the elevated end position. Mounted in the body member and operatively coupled to the lock post member is a means for moving the lock post member along the guide path against the bias force of the bias means to the retracted end position. A latch-release means is also mounted in the body member and engageable with the lock post member for releasably holding the lock post member at the retracted end position.

The invention may further include load transfer means in the body member and engageable with the lock post member for transferring horizontal load forces incident on the lock post member to the body member when the lock post member is in its elevated end position.

Guide grooves may be disposed in the side walls of a recess in the body member wherein at least a portion of the lock post member is at all times disposed, the groove defining a guide path and slidably accepting guide follower arms extending from the sides of the lock post member.

The features of the present invention which are believed to be novel are set forth with particularity in the appended claims. The present invention, both as to its organization and manner of operation, together with further objects and advantages thereof, may best be understood by making reference to the following description, taken in conjunction with the accompanying drawings in which like reference characters refer to like elements in the several views.

DESCRIPTION OF THE PREFERRED EMBODIMENT

Figure 1:
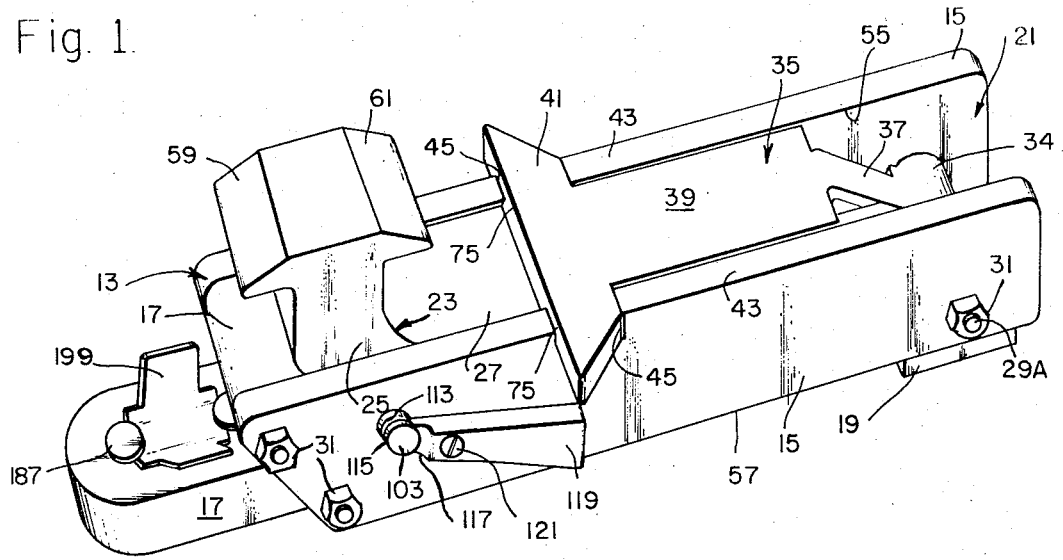
FIG. 1 is a perspective view of a cargo pallet lock constructed in accordance with the present invention.

Referring now to the drawing and more particularly to FIG. 1, there is shown a cargo pallet lock assembly 11 constructed in accordance with the present invention. The assembly 11 includes a body member 13 having a pair of side plates 15 spaced by a forward fixture 17 and a rearwardly disposed guide block 19. The spacing of the side plates 15 defines an elongated body recess 21 in which is movably disposed a lock post member 23 having a generally upstanding T-shaped head portion 25 and a longitudinally extending shank portion 27.

The body member, in this embodiment, is an assembly of the parts mentioned and held together by suitable bolts 29, nuts 31, and machine screws 33, for example, although other attachment means such as welding may be employed. The rear bolt 29A also serves as a pivot post for a journalled transverse tubular portion of a retract lever 35, the handle also having a reduced width neck portion 37 and a broad width shank portion 39 leading to a transversely disposed T-shaped handle or latch bar 41. In its normal position, shown in FIG. 1, the shank portion 39 and the latch bar portion 41 lie essentially in a horizontal plane flush with the upper edges 43 of the side plates 15, the latch bar 41 being seated in conforming notches 45 in the plates' upper edges, 43.

Figure 2:
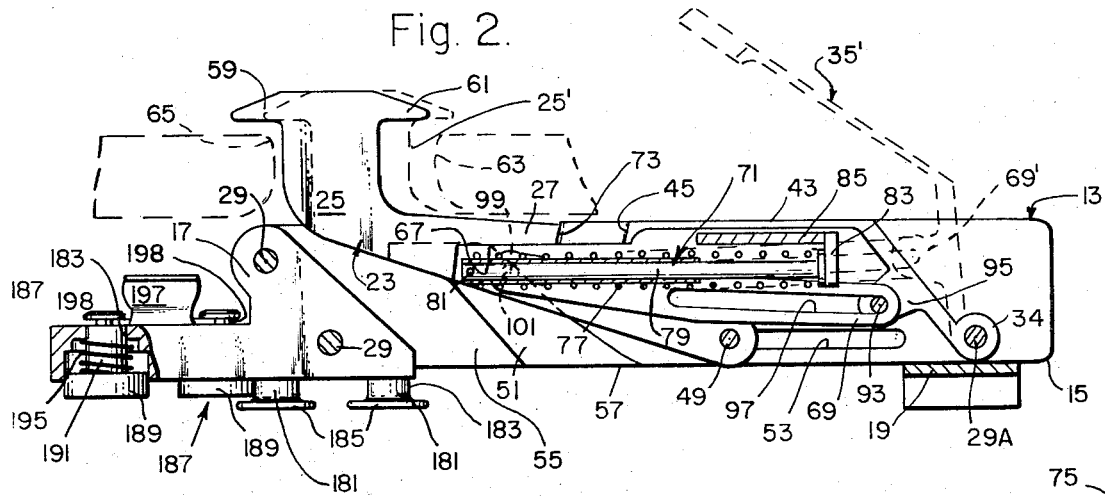
FIG. 2 is a sectional representation in elevation and partially broken away of the cargo pallet lock shown in FIG. 1.
Figure 3:
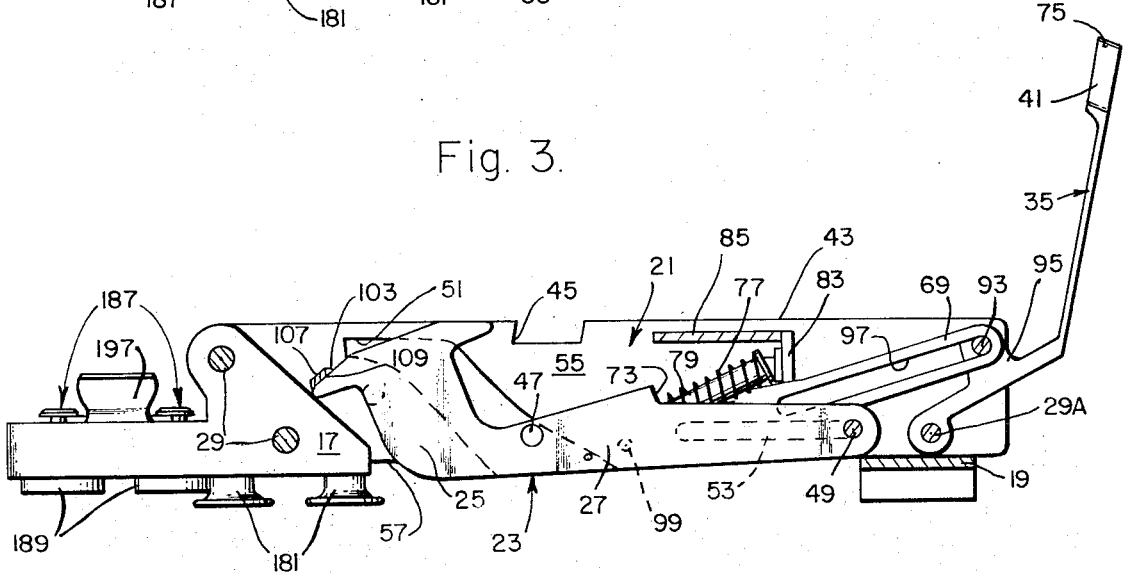
FIG. 3 is an elevation similar to that illustrated in FIG. 2, but showing the lock post retracted.
Figure 4:
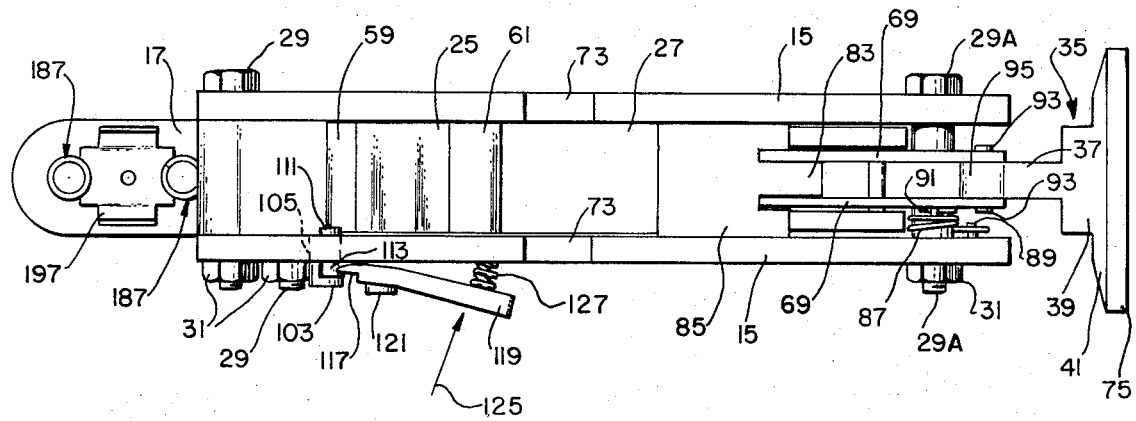
FIG. 4 is a plan view of the cargo pallet lock shown in FIG. 3.

Referring now also to FIGS. 2, 3, and 4, the lock post member 23 is shown movably mounted in the body member 13 and guided along a pre-determined path by forward and rear cam follower arms 47 and 49 which extend from the sides of the member 23 into and are movably captured by respective forward and rear elongated cam grooves 51 and 53 in the inner walls 55 of the side plates 15. The rear grooves 53 are disposed near the body's lower surface 57 and are essentially horizontal (see FIG. 2). The forward grooves, on the other hand, define an upward and forward extending smoothly curved path, the upper portion being generally horizontal for a pre-determined distance such as about one-half inch, for example (see FIG. 3).

The lock post member 23 is shown in FIGS. 1 and 2 in its most forward, elevated end position where its head portion 25, with its overhanging flanges 59 and 61, is able to engage and restrain a downstream transverse end of a cargo pallet, as generally outlined by dashed line 63, and simultaneously an upstream transverse end of an adjacent cargo pallet, shown as dashed outline 65 in FIG. 2.

The lock post member 23 is preferably cast or machined from a light but strong metal, and is provided with an elongated vertical slot 67 along its shank portion 27 so as to accommodate the movement of a pair of spaced lock post retract links 69 and an elongated bias spring assembly 71. The member 23 further is shown provided with a vertical loan transfer ledge 73 in the upper surface of the shank portion 27. In the elevated end position of the lock post member, the ledge abuts an outer end surface 75 of the latch bar 41 so that any load incident on the head portion 25 and directed toward the rear of the assembly 11 will be transferred to the latch bar 41, which in turn, will transfer the load to the body member 13 by virtue of the latch bar being seated in the shape conforming notches 45.

The member 23 is biased to move in a generally forward direction toward the aforementioned elevated end position shown in FIGS. 1 and 2. The bias means, in this embodiment, is the spring assembly 71 which includes an elongated compression spring 77 mounted about and captured by a telescoping spring guide rod and sleeve arrangement 79 that is pivotally anchored by a pin 81 at its forward end in the apex of the lock post member's elongated slot 67, and at its rear end by a depending bracket 83 of a spring retainer member 85 mounted by simple pins, for example, just below the body plates upper edges 43.

FIGS. 2 and 3 illustrate the lock post retracting operation of the assembly 11. Prior to such operation, the retract lever 35 lies in its normal "seated" position as urged by a bias coil spring 87 mounted about the rear bolt 29A and anchored at its ends by a plate mounted pin 89 and by a handle mounted pin 91. Upon being lifted and rotated toward the rear of the assembly, the lock post member is pulled backwards, against the bias force of the elongated spring 77, by means of the retract links 69. These links are coupled between the lever 35 and the lock post member 23 by link coupling pins 93 extending from opposite sides of a bracket portion 95 of the lever 35 and slidably captured in elongated slots 97 in the links 69, and by individual link-mounted forward pins 99 suitably extending into holes 101 in the inner sides of the lock post member slot 67.

The retract operation first causes the lock post head portion 25 to move horizontally in a rearward direction for the previously mentioned pre-determined distance to easily disengage from the transverse end of a pallet 63 (after the adjacent pallet 65 has been removed). At this point, the retract lever 35 will be in approximately the position indicated in FIG. 2 by dashed outline 35A, and the lock post's head portion will be approximately situated as indicated by dashed outline 25A. Further rotation of the lever 35 to its final position shown in FIGS. 3 and 4, causes the lock post member 23 to follow the path defined by the forward and rear cam grooves 51 and 53 to its retracted end position in the recess 21.

The lock post member is releasably held in the retracted configuration by a latch-release pin 103 slidably mounted in a horizontal bore 105 in a plate 15. The pin is located opposite the position of the retract lock post's head portion 25 (FIG. 3) and has an upper sloping surface 107 and a lower straight surface 109 at its inner end 111, and a reduced diameter or notched section 113 adjacent its outer end 115. A forked end 117 of a latch release lever 119 is disposed in the notched section 113 and the lever 119 is loosely anchored at a point intermediate its ends by an anchor bolt 121. Upon being retracted, the side of the head's forward flange 59 engages the latch release pin's sloping surface 107 and pushes the pin outwardly before sliding by its end 111. Once the head 25 is beyond the pin 103, the pin is urged back to its original position by the bias action of a compression spring 123 mounted in appropriate recesses (not shown) in the plate 15 and the latch release lever 119, as best illustrated in FIG. 4.

When the retract lever 35 is then released, the spring 87 causes the lever to rotate forward until its latch bar portion 41 is seated in the notches 45. The lock post member 23 is now restrained from moving forward under the influence of the bias means because its upper head portion is in contact with the lower straight surface 109 of the latch release pin 103 (see FIGS. 3 and 4). In that the lock post is now held in its retracted end position, the retract handle is allowed to rotate forward because its coupling pins 93 may slide in the elongated slots 97 of the retract links 69.

To release the member 23 and allow it to snap forward and upwardly to its elevated end position, only a nominal amount of pressure need be applied to the outer surface of the latch release lever 119, as indicated by arrow 125. Such pressure causes the lever 119 to rock about its fulcrum at the bolt 121 which moves its forward end 117 away from the plate 15 and pulls the pin 103 in an outward direction.

Figure 5:
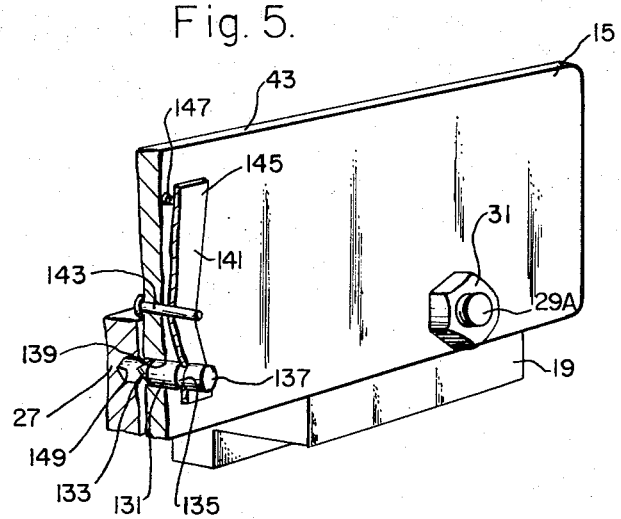
FIG. 5 is a perspective view of a portion of the cargo pallet lock body illustrating a lock post release assembly in accordance with another embodiment of the invention.

Alternately, the latch release pin and its activating lever may be located elsewhere in the body member 13 to releasably hold the lock post member 23 in its retracted end position. For example, in the embodiment of the invention illustrated in FIG. 5, an elongated pin 131 having an inner hemispherical end 133 and a reduced diameter section 135 adjacent an outer end 137 may be slidably disposed in a horizontal bore 139, in the general area of the guide block 19. A bent latch release lever 141 is suitably connected to the pin 131 at the reduced diameter section 135 and is loosely anchored by an anchor pin 143 at a point spaced from the ends thereof, about which point the lever 141 rocks when inwardly directed pressure is applied to the lever's trigger end 145 against the outwardly directed bias force exerted thereon by a compression spring 147 mounted between the end 145 and the plate 15.

In operation, the inner end 133 of the pin 131 bears upon and slides along the outer surface of the lock post's shank portion 27 until, at the retracted end position, the pin 131 may enter a retaining depression or bore 147 in the shank portion. The bias force provided by the spring 147 will maintain the pin 131 in the bore 149 until the pin is pulled out by manual pressure on the lever's trigger end 145. It will also be noted that in this embodiment, the trigger end 145 is disposed adjacent the upper edge of the body member 13 for easy access thereto by an operator.

Figure 6:
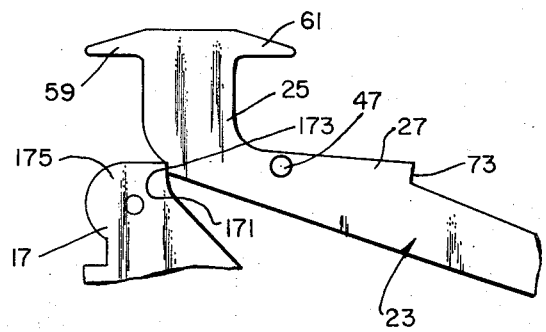
FIG. 6 is an elevational representation showing a lock post and abutting forward fixture configured in accordance with still another embodiment of the invention.

In accordance with yet another embodiment of the present invention illustrated in FIG. 6, horizontal loan forces directed in a forward direction may be even more suitably dealt with by providing conforming vertical loan transferring surfaces 171 and 173 respectively on an upper portion 175 of the forward fixture 17 and on the lower section of the lock post member's head portion 25.

The cargo pallet lock assembly 11 is adapted to be readily mounted in and moved along a conventional longitudinal track in a load-supporting vehicle floor structure. For simplicity, such conventional track structures are not herein illustrated. The floor structure generally includes two such tracks in spaced-parallel relationship longitudinally through the vehicle, each track having a relatively narrow elongated slot centrally located in its upper surface and communicating with a relatively wider interior track groove or cavity. Also, accurately spaced arcuate cutout portions are disposed along the track to accept conventional mounting arrangements.

As illustrated in FIG. 2, the mounting arrangement of the assembly 11 includes a pair of longitudinally-aligned lugs 181 having a reduced diameter neck portion 183 dimensioned to just slide along the track's slot, and an increased diameter lower end portion 185. The lugs depend from the rear portion of the forward fixture 17 and are spaced and their end portions 185 are dimensioned to readily enter any two adjacent ones of the cutout portions in the track before being moved along the slot a short distance to a position where the lugs 181 are about midway between the cutout portions and captured as to vertical movement by the track.

In order to releasably hold the lugs 181 in this captured position, a pair of longitudinally aligned lock plunger arrangements 187 are mounted in the forward fixture 17 immediately in front of the lugs 181. Each of the plunger arrangements include a plunger 189 with a reduced diameter shank portion 192 slidably mounted in a vertical bore 183 in the fixture 17, and with a lower head portion dimensioned to slidably fit into the track's cutout portion. Each plunger 189 is biased in a downward direction by a coil spring 195 disposed about the shank portion 191, but the plungers may be lifted to a position within the body of the fixture 17 by lifting a handle 197 that engages annular notches 198 adjacent the upper ends of the shank portions 191. The plungers 189 are spaced apart by the same distance that exists between the lugs 181, but are located relative to the lugs 181 to enter adjacent ones of the track cutout portions only when the lugs 181 are located at the previously described position between the cutout portions. The plunger arrangements 187 thus releasably prevent the assembly 11 from sliding in either longitudinal direction once the lugs 181 are captured in the interior track groove. It should here be noted that the guide block 19 is dimensioned to extend into the track's longitudinal slot to provide lateral stability.

In use of the present invention, a pallet is inserted through the door opening of a vehicle onto a conventional ball mat and then pushed along rollers positioned along-side the track in a direction generally parallel to the longitudinal axis of the vehicle to the farthest extent possible, either forward or aft depending on whether the cargo loading door is located in the rear or forward part of the vehicle. At the end of the desired travel, the first of such pallets is retained at its upstream transverse end by usually a plurality of conventional terminal locks. As the pallet moves over the recessed track, it also passes over any cargo pallet lock assemblies 11 that are releasably fixed to the track, the lock assemblies being in their retracted configuration. Once the pallet reaches the terminal locks, and if the assemblies 11 are in a proper position with respect to the longitudinal dimension of the pallet, the loading personnel need only press the latch release lever to free the lock post member 23 so that it moves upward and along its predetermined path where it engages and restrains the pallet's downstream transverse end. The next pallet is then pushed along the track, over the retracted lock assemblies 11, until its upstream transverse end engages the first elevated lock post member. The next assembly is then actuated to restrict the pallet's vertical and longitudinal movement, and so on until all the pallets are secure.

The materials used in this fabrication of the various embodiments of the invention are not considered critical and any material generally considered satisfactory for a particular use or function may be utilized.

From the foregoing, it should be evident that there has herein been described a self-erecting cargo pallet lock that overcomes many disadvantages of the prior art and which constitutes a significant advancement of the art.

Although exemplary embodiments of the invention have been shown and described, changes and modifications and other embodiments of the inventory may be made by one having ordinary skills in the art without necessarily departing from the spirit and scope of the invention.

What is claimed is:

1. A self-erecting cargo pallet lock for securing a load supporting member in a vehicle having a supporting floor structure, comprising the combination of:
   a lock post member;
   a body member securable to the floor structure below the load supporting surface thereof and adjacent the load supporting member;
   guide means associated with said body member and said lock post member for slidably mounting said lock post member to said body member along an elongated guide path, said lock post member being movable along said guide path between an elevated end position in which said lock post member extends upwardly beyond said body member and at least partially into the plane of and lockably engagable with the load supporting member and a retracted end position in which said lock post member lies below the load supporting member;
   bias means mounted in said body member and engaging said lock post member for biasing the member of said lock post member along said guide path toward said elevated end position;
   retract means mounted in said body member and operatively coupled to said lock post member for moving said lock post member along said guide path against the bias force of said bias means to said retract end position; and
   latch-release means mounted in said body member and engagable with said lock post member for releasably holding said lock post member at said retract end position.

2. The cargo pallet lock according to claim 1, also comprising load transfer means in said body member and engageable with said lock post member for transfering horizontal load forces incident on said lock post member to said body member when said lock post member is in said elevated end position.

3. The cargo pallet lock according to claim 2, wherein said body member has an elongated recess therein and at least a portion of said lock post member is at all times movably disposed in said recess, and wherein said guide means includes guide grooves in the side walls of said recess defining said guide path, said guide means also including guide follower arms extending from the sides of said lock post member into said guide grooves.

4. The cargo pallet lock according to claim 3, wherein said guide paths defined by said guide grooves is configured to cause at least a head portion of said lock post member extending beyond said body member when the latter is in said elevated end position to move a pre-determined distance in a horizontal position before descending into said recess when said retract means is first actuated to retract said lock post member from said elevated end position.

5. The cargo pallet lock according to claim 4, wherein said lock post member is of unitary construction with said head portion longitudinally extending from the bottom of said shank portion, said head portion having essentially a T-configuration and said shank portion carrying said follower arms.

6. The cargo pallet lock according to claim 5, wherein said follower arms include a first set of two axially aligned and oppositely extending posts at a forward end of said shank portion and a second set of axially aligned and oppositely extending posts at a rear end of said shank portion.

7. The cargo pallet lock according to claim 6, wherein said guide path followed by said second set of posts is essentially horizontal, and wherein said guide path followed by said first set of posts is diagonally inclined upwardly in the general direction of movement of said lock post member urged by said bias means, the diagonal inclination terminating in a horizontal path equal in length to said pre-determined distance.

8. The cargo pallet lock according to claim 3, wherein said retract means includes a retract lever pivotally mounted in said body member and a linkage assembly operatively coupled to said retract lever and to said shank portion of said lock post member to pull said lock post member along said guide path against said bias force and toward said retract end position when said retract lever is manually operated.

9. The cargo pallet lock according to claim 8, wherein said bias means includes a compression spring assembly anchored at one end by said body member and anchored at another end by said shank portion of said lock post member, said compression spring being disposed about a telescoping tube assembly.

10. The cargo pallet lock according to claim 3, wherein said latch-release means includes a release pin slidably mounted in said body member and extending into said recess and thereat engageable with said lock post member to prevent movement thereof, said latch-release means also including a bias release lever mechanism pivotally mounted on said body member and operatively coupled to said release pin whereby manual operation of said release lever moves said release pin out of engagement with said lock post member.

11. The cargo pallet lock according to claim 10, wherein said release pin is engageable with the upper surface of said head portion of said lock post member.

12. The cargo pallet lock according to claim 10, wherein said release pin is engageable with a side surface of said shank portion of said lock post member.

13. The cargo pallet lock according to claim 8, wherein said retract lever is pivoted at a first end thereof about a horizontal axis of rotation, said axis of rotation being disposed adjacent an end of said body member most removed from said head portion and orthogonal to the direction of movement of said lock post member as seen in a vertical plane, said retract means also including a return spring anchored in said body member and engaging said retract lever to bias said retract lever to rotate in an arc above said body member and toward said head portion of said lock post member.

14. The cargo pallet lock according to claim 13, wherein said retract lever includes a transverse handle portion extending beyond both sides of and engageable with said body member, said body member including handle portion conforming transverse notches in the walls thereof on opposite aligned sides of said recess wherein said handle portion is seatable.

15. The cargo pallet lock according to claim 14, wherein said load transfer means includes a vertical load transfer surface in an upper surface of said shank portion of said lock post member, said load transfer surface being juxtaposed a conforming outer extremity surface of said handle portion when said handle portion is seated in said transverse notches in said body member whereby horizontal load forces incident on said head portion of said lock post member in the direction opposite that urged by said bias means thereon are transferred through said handle portion to said body portion.

16. The cargo pallet lock according to claim 3, wherein said load transfer means also includes a vertical load transfer shoulder in an end of said recess accommodating said head portion of said lock post member, and further includes a shoulder-conforming surface at a lower end of said head portion that is juxtaposed said shoulder when said lock post member is in said elevated end position whereby horizontal load forces incident on said head portion in the direction urged by said bias means thereon are transferred directly to said body member.

* * * * *